(12) United States Patent
Johnson et al.

(10) Patent No.: US 10,727,486 B2
(45) Date of Patent: Jul. 28, 2020

(54) LITHIUM OXYHALIDE ELECTROCHEMICAL CELL WITH CARBON MONOFLUORIDE

(71) Applicant: Electrochem Solutions, Inc., Clarence, NY (US)

(72) Inventors: Arden P. Johnson, Arlington, MA (US); Yufei Wang, South Easton, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 600 days.

(21) Appl. No.: 14/968,600

(22) Filed: Dec. 14, 2015

(65) Prior Publication Data

US 2016/0172668 A1  Jun. 16, 2016

Related U.S. Application Data

(60) Provisional application No. 62/090,919, filed on Dec. 12, 2014.

(51) Int. Cl.

| | |
|---|---|
| *H01M 4/38* | (2006.01) |
| *H01M 4/36* | (2006.01) |
| *H01M 4/133* | (2010.01) |
| *H01M 6/24* | (2006.01) |
| *H01M 6/18* | (2006.01) |
| *H01M 4/583* | (2010.01) |

(Continued)

(52) U.S. Cl.
CPC ......... *H01M 4/5835* (2013.01); *H01M 4/133* (2013.01); *H01M 4/368* (2013.01); *H01M 6/185* (2013.01); *H01M 6/24* (2013.01); *H01M 10/0563* (2013.01); *H01M 4/405* (2013.01); *H01M 4/587* (2013.01); *H01M 4/625* (2013.01); *H01M 10/0525* (2013.01); *H01M 2300/002* (2013.01)

(58) Field of Classification Search
CPC .... H01M 4/5835; H01M 4/133; H01M 4/368; H01M 10/0563; H01M 6/185; H01M 6/24
USPC ....................................................... 429/163
See application file for complete search history.

(56) References Cited

U.S. PATENT DOCUMENTS

| | | |
|---|---|---|
| 4,052,539 A | 10/1977 | Shropshire et al. |
| 4,278,741 A | 7/1981 | Kalnoki-Kis |

(Continued)

OTHER PUBLICATIONS https://www.merriam-webster.com/dictionary/catholyte accessed on Feb. 3, 2019.*

(Continued)

*Primary Examiner* — Jonathan G Jelsma
(74) *Attorney, Agent, or Firm* — Michael F. Scalise

(57) ABSTRACT

The present invention relates to an oxyhalide electrochemical cell comprising an anode of a Group IA metal and a cathode of a composite material prepared from a first electrochemically active carbonaceous material and a second electrochemically non-active carbonaceous material. The cathode material of the present invention provides increased discharge capacity compared to traditional lithium oxyhalide cells. In addition, the cathode material of the present invention is chemically stable which makes it particularly useful for applications that require increased rate capability in extreme environmental conditions such as those found in oil and gas exploration.

19 Claims, 2 Drawing Sheets

(51) Int. Cl.
*H01M 10/0563* (2010.01)
*H01M 10/0525* (2010.01)
*H01M 4/40* (2006.01)
*H01M 4/587* (2010.01)
*H01M 4/62* (2006.01)

(56) References Cited

U.S. PATENT DOCUMENTS

| | | | |
|---|---|---|---|
| 4,293,622 A | 10/1981 | Marincic et al. | |
| 4,371,592 A | 2/1983 | Gabano | |
| 4,400,453 A | 8/1983 | Blomgren et al. | |
| 4,416,957 A | 11/1983 | Goebel et al. | |
| 4,563,401 A | 1/1986 | Kane et al. | |
| 4,608,322 A | 8/1986 | Howard et al. | |
| 5,569,553 A | 10/1996 | Smesko et al. | |
| 6,306,540 B1 | 10/2001 | Hiroi et al. | |
| 6,489,055 B1 | 12/2002 | Ichihashi et al. | |
| 6,780,542 B2 | 8/2004 | Spillman et al. | |
| 2007/0059599 A1* | 3/2007 | Rubino | H01M 4/136 429/209 |
| 2007/0143989 A1* | 6/2007 | Polsonetti | B22F 3/003 29/730 |
| 2009/0111021 A1* | 4/2009 | Yazami | H01G 11/38 429/209 |
| 2009/0246561 A1* | 10/2009 | Johnson | H01M 4/382 429/9 |
| 2010/0310907 A1* | 12/2010 | Miller | H01M 4/485 429/90 |
| 2016/0359158 A1* | 12/2016 | Janakiraman | H01M 2/1653 |

OTHER PUBLICATIONS

Touhara, et al., "On the Structure of Graphite Fluoride", Z. anorg. allg. Chem. 544; 1987, 7-20.

* cited by examiner

LITHIUM OXYHALIDE ELECTROCHEMICAL CELL WITH CARBON MONOFLUORIDE

CROSS-REFERENCE TO RELATED APPLICATION

This application claims priority from U.S. Provisional Application Ser. No. 62/090,919, filed Dec. 12, 2014.

TECHNICAL FIELD

This invention relates to the art of electrochemical cells, and more particularly, to a new and improved electrochemical cell, and a cathode therefore. The cell comprises a Group IA anode and a new composite cathode material. Still more particularly, the present invention is directed to a cathode material composition for a lithium oxyhalide electrochemical cell comprising a mixture of an electrochemically active material and an electrochemically non-active material.

BACKGROUND OF THE INVENTION

Electrochemical cells provide electrical energy that power a host of electronic devices ranging from medical devices to electronic devices utilized in gas and oil exploration. Among these many devices powered by electrochemical cells are electronic devices such as pipeline inspection gauges that are used in down-hole petroleum exploration. Such devices generally require the delivery of a significant amount of current over long periods of time in relatively harsh environments. Thus, these devices typically require the use of electrochemical cells, such as lithium oxyhalide electrochemical cells, that provide increased delivery capacity and rate of charge delivery. In addition, these cells must be able to safely operate in harsh environments that may comprise elevated temperatures, increased atmospheric pressures, caustic environments, explosive atmospheres, or combinations thereof.

Since these cells power devices that typically operate in remote, harsh environments, it is ideal to know ahead of time when a cell is reaching its end-of-life and, thus, requires replacement. A depleted cell could result in loss of data and/or lost operating time due to a non-operating device. Therefore, it is ideal to have a reliable end-of-life indicator to optimize the timing of cell removal and minimize down time.

As defined herein, "delivery capacity" is the maximum amount of electrical current that can be drawn from a cell under a specific set of conditions. The terms, "rate of charge delivery" and "rate capability" are defined herein as the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry.

A traditional lithium oxyhalide electrochemical cell comprises an anode composed of lithium and a cathode composed of an electrochemically non-active carbon material, such as acetylene black. In addition, a traditional lithium oxyhalide cell comprises a catholyte that is typically composed of an electrochemically active cathode material and liquid electrolyte. In general, the catholyte is composed of a highly oxidizing liquid, i.e., thionyl chloride or sulfuryl chloride that also serves as the electrochemically active cathode material. Because the catholyte provides both the electrochemically active cathode material and the electrolyte in a lithium oxyhalide cell, the cell volume is generally efficiently utilized. As a result, lithium oxyhalide cells typically have energy densities on the order of about 700 to about 1200 Wh/L in comparison to primary cells of other chemistries. The generally high energy densities and the ability of such batteries to operate under extreme temperature conditions make lithium oxyhalide electrochemical cells ideally suited to power a wide range of devices used in extreme environments that require a long discharge life.

As defined herein, "non-active" means that the material does not undergo an electrochemical reaction within an electrochemical cell. For example, acetylene black is non-active within an oxyhalide cell as it does not chemically react with the liquid oxyhalide catholyte. The term "active" means that the material undergoes an electrochemical reaction within an electrochemical cell. The term "catholyte" means an ionically conductive solution that is operatively associated with the anode and the cathode.

During discharge of a traditional lithium oxyhalide electrochemical cell, the active cathode material within the catholyte undergoes an electrochemical reduction reaction with lithium supplied by the anode. This reduction reaction typically continues at a constant rate until either of the catholyte or the anode lithium material is exhausted. As a result, the voltage of a lithium oxyhalide cell generally remains stable throughout discharge until end-of-life is reached. Because the discharge voltage typically remains stable throughout cell discharge, monitoring the discharge voltage is not an ideal indicator that the cell is nearing end-of-life.

In other primary electrochemical cell chemistries, the operating voltage of the cell typically decreases as the cell is discharged. Therefore, the operating voltage can be used as an indicator of a cell's state of discharge. The cell discharge voltage in these other chemistries can therefore be used to provide a warning that the cell is nearing the end of its useful life, thus allowing the cell to be replaced before failure occurs. However, because the operating voltage in lithium oxyhalide cells generally remains substantially constant, monitoring discharge voltage does not provide a reliable indicator about the state of discharge. Thus, there is a risk that the cell may abruptly reach end-of-life with little warning, thereby possibly resulting in unexpected device failure and/or data loss.

Therefore, other embodiments of monitoring the state of discharge of lithium oxyhalide cells have been developed. One such embodiment of monitoring the state of discharge of a lithium oxyhalide cell is measuring the amount of energy that has been extracted from the cell during discharge. Various electronic circuits have been developed to monitor energy that is consumed during cell discharge. One of the most common of these electronic techniques is Coulomb counting. In Coulomb counting, the state of discharge is determined by measuring the amount of current flow. Specifically, a circuit is connected to the cell that measures the voltage drop across a resistor in the circuit. However, electric circuitry such as a Coulomb counting circuit consumes energy from the cell and, thus, becomes a parasitic load that reduces available energy. Another problem with electronic circuits is that the electronic components that comprise these circuits typically become unreliable at increased temperatures. This is particularly problematic at the elevated temperature conditions in which lithium oxyhalide cells typically operate.

A second approach is to design the lithium oxyhalide cell with an additional secondary cathode. These cells comprise a second cathode having a higher impedance than the primary cathode. Therefore, when these cells near end-of-life, the secondary cathode delivers a lower voltage as compared to the discharge voltage previously delivered. The drop in discharge voltage that typically occurs at the end-of-life of the cell is thus used as an indicator of approaching end-of-life. An example of such a cell construction is disclosed in U.S. Pat. No. 5,569,553 to Smesko et al., which is assigned to the assignee of the present invention and incorporated herein by reference. Additional examples of electrochemical cells comprising secondary cathodes can also be found in U.S. Pat. No. 4,293,622 to Marincic et al. and U.S. Pat. No. 4,563,401 to Kane et al., both of which are herein incorporated by reference. In practice, however, such cell designs have proven to be ineffective because measurable voltage differences that are useful for indicating an end-of-life condition are only observed under limited discharge conditions that typically do not occur in most cases of lithium oxyhalide cell use.

A third approach is to include a secondary anode material within the anode construction. The secondary anode material is designed to discharge at a lower voltage after the primary lithium metal anode material has been consumed. U.S. Pat. No. 4,416,957 to Goebel et al., incorporated herein by reference, describes the use of a calcium metal as a secondary anode material. This cell design provides a lower discharge voltage step near end-of-life after the primary anode lithium metal has been consumed. In practice, however, it has been found that anodes comprising calcium metal discharge poorly in an oxyhalide catholyte and, thus, do not establish a reduced voltage that is stable for a long enough period of time to act as a reliable end-of-life indicator.

Yet another approach is to include a secondary catholyte material in the cell that discharges against the remaining lithium metal anode material after the first liquid cathode material, e.g., thionyl chloride, has been consumed. U.S. Pat. No. 4,371,592 to Gabano, incorporated herein by reference, describes the addition of phosphoryl chloride and benzoyl chloride, respectively, as secondary active catholytes. These cells are designed to discharge at a lower voltage after the thionyl chloride active electrolyte has been consumed. In practice, however, these secondary liquid cathode materials are known to form complex intermediate species through reaction with the first liquid cathode materials, such as thionyl chloride and associated discharge products. Thus, as a result, the drop in discharge voltage is typically not significant enough to discern between discharge states and act as a reliable indicator of cell end-of-life.

In general, the inclusion of a secondary anode or cathode material reduces the discharge voltage of a lithium oxyhalide cell. In addition, the additional anode or cathode material occupies volume within the cell that could otherwise be occupied by materials that exhibit increased discharge voltage. Thus, as a result, the total energy and energy density of the cell is reduced than would otherwise be available in the absence of these lower voltage materials.

Therefore, what is needed is a lithium oxyhalide cell that provides increased energy density with a distinct indication of approaching end-of-life. More specifically, a lithium oxyhalide cell that provides increased energy density and a distinct indication of approaching end-of-life that does not rely on external electronic circuitry or comprise a secondary anode, cathode or electrolyte having a reduced discharge voltage within a lithium oxyhalide cell. Thus, the present invention addresses these problems by providing a cathode material composition and cathode thereof for a lithium oxyhalide electrochemical cell having an increased discharge capacity, energy density and further provides a discernible end-of-life indicator.

SUMMARY OF THE INVENTION

The cathode material of the present invention provides a cathode and a lithium oxyhalide electrochemical cell thereof having an increased discharge capacity, energy density and a discernible end-of-life indicator in comparison to prior art lithium oxyhalide cells. The present invention relates to an electrochemical cell comprising an anode of a Group IA metal and a cathode composed of a composite material prepared from a combination of electrochemically active and non-active materials.

Specifically, the present invention is of an oxyhalide electrochemical cell having a lithium anode and a solid cathode comprised of a mixture of a first cathode material of an electrochemically active fluorinated carbon material, preferably, carbon monofluoride ($CF_x$) and a second cathode material of an electrochemically non-active carbonaceous material. The addition of the electrochemically active material with the electrochemically non-active material produces a solid cathode for use within a lithium oxyhalide cell having an increased overall discharge/charge capacity in comparison to a lithium oxyhalide cell comprising a cathode constructed without the active material. Furthermore, in some embodiments, the addition of the active material within the solid cathode causes a lithium oxyhalide cell to exhibit a secondary discharge plateau that occurs generally near a cell's end-of-life state. Thus, this secondary discharge plateau can be used as an indicator of the cell's approaching end-of-life.

In a traditional lithium oxyhalide electrochemical cell, a reduction reaction occurs between the active cathode constituents in the catholyte and lithium ions supplied by the anode. This reduction reaction produces a discharge voltage and reaction products which deposit on the surface and within pores of the cathode composed of a non-active carbon material. Discharge of the lithium oxyhalide cell continues until either the anode or oxyhalide materials are consumed or the surface area of the cathode becomes fully occupied with reaction product, thereby causing the reduction reaction to cease.

In the present invention, in contrast to the prior art, an active cathode material, specifically carbon monofluoride, ($CF_x$), is incorporated within the non-active material structure of the cathode of a lithium oxyhalide cell. The incorporation of the active material within the cathode structure substantially increases the discharge capacity exhibited by the cell. This increase in discharge capacity is generally believed to occur because the active material, i.e., carbon monofluoride, has a greater specific surface area in comparison to the non-active carbon. As a result, the incorporation of carbon monofluoride provides the cathode with increased surface area on which additional catholyte reduction reaction product deposit. Thus, the reduction reaction is extended and, as a result, discharge capacity of the cell is increased.

In addition, in some embodiments, the incorporation of carbon monofluoride within the non-active material cathode structure produces a substantially stable secondary voltage discharge plateau. This discharge voltage plateau, which generally occurs at or less than 3.0 V, typically occurs near the end-of-life of the cell. Thus, the secondary discharge voltage plateau serves as a discernible end-of-life indicator.

The occurrence of this second discharge voltage plateau is the result of a second reduction reaction that occurs between lithium ions and the active $CF_x$ material within the cathode. This second reduction reaction provides a substantially stable discharge voltage that manifests as a secondary discharge voltage plateau and a discernible end-of-life indicator. Therefore, a cathode comprising the combination of active $CF_x$ and non-active carbon provides a lithium oxyhalide cell having an extended discharge voltage, increased capacity and a discernible end-of-life indicator.

DETAILED DESCRIPTION OF THE PREFERRED EMBODIMENTS

Figure 1:
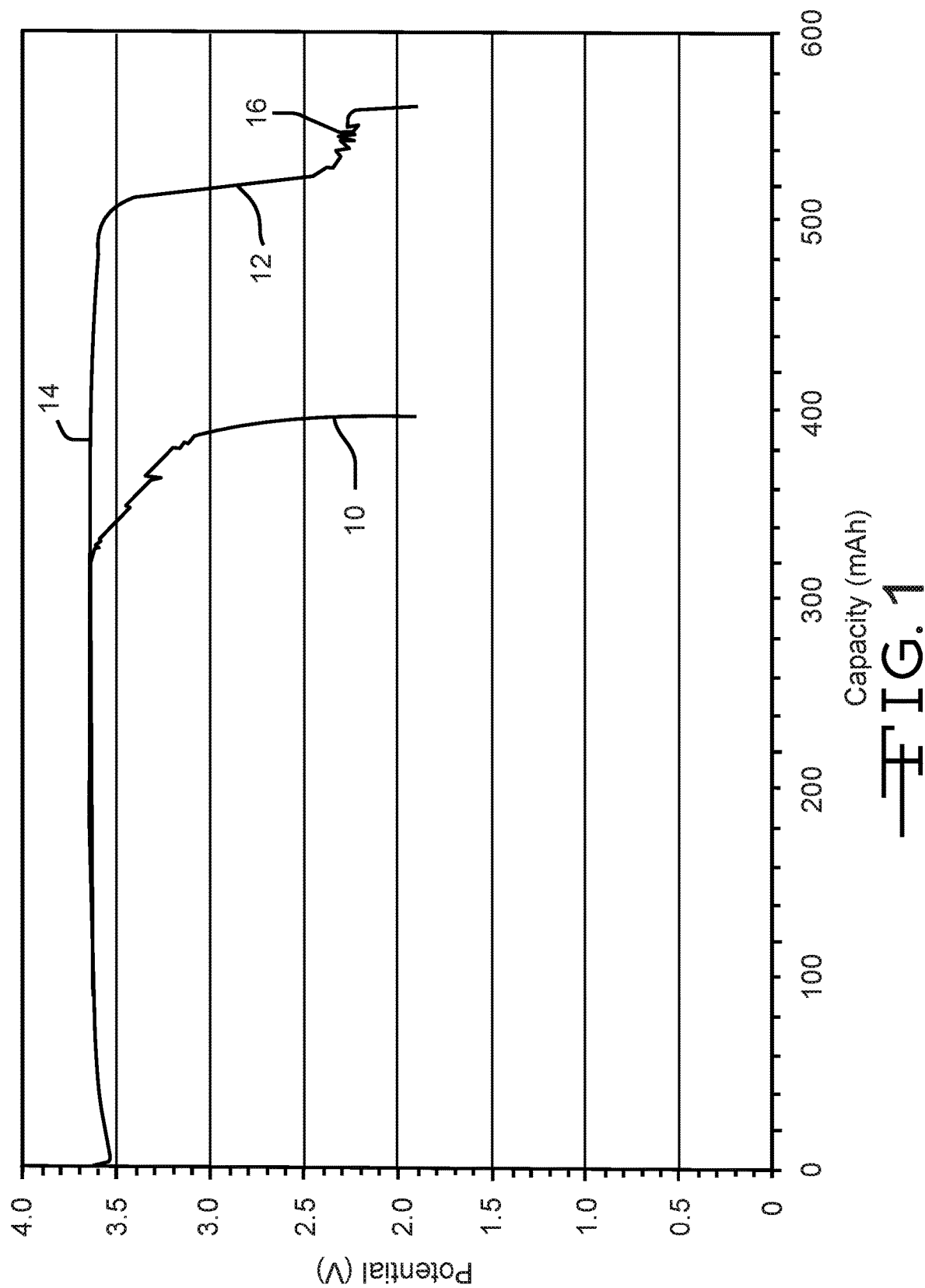
FIG. 1 illustrates the results of discharge testing of two lithium oxyhalide electrochemical cells. One cell was constructed according to an embodiment of the present invention comprising a cathode composed of a mixture of acetylene black and carbon monofluoride ($CF_x$). The second cell was constructed comprising a cathode composed of acetylene black.

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—Mg, Li—B and Li—Si—B alloys and intermetallic compounds. The preferred anode comprises lithium.

The form of the anode may vary, but typically, the anode is a thin sheet or foil of the anode metal, pressed or rolled on a metallic anode current collector, i.e., preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate smaller volume cell design.

The electrochemical cell of the present invention further comprises a cathode comprised of a combination of a first material that is electrochemically active and a second material that is electrochemically non-active, but electrically conductive. The cathode is preferably of solid materials and the electrochemical reaction at the cathode involves conversion of ions that migrate from the anode to the cathode into atomic or molecular forms.

The solid cathode of the present invention preferably comprises a first electrochemically active material and a second electrochemically non-active material. More preferably, the first active cathode material comprises a fluorinated carbonaceous material and the second cathode material comprises a material of a non-electrochemically active carbonaceous chemistry. Most preferably, the first electrochemical active cathode material comprises carbon monofluoride ($CF_x$). Preferred second non-active carbonaceous cathode materials may include acetylene black, graphitic and non-graphitic forms of carbon, coke, charcoal, KETJEN Black®, and combinations thereof.

In a traditional lithium oxyhalide electrochemical cell, the cathode is entirely composed of a carbon material that is electrochemically non-active, but electrically conductive. The cathode of a traditional lithium oxyhalide cell does not chemically react within the cell but provides a surface on which reaction products from a reduction reaction between lithium ions from the anode and active cathode constituents from the catholyte deposit. Discharge of a traditional lithium oxyhalide cell continues until either of the anode or catholyte materials are exhausted, or the surface area of the cathode becomes occupied with reaction products.

In contrast, the cathode of the present invention comprises an active material portion in addition to a non-active material. More specifically, some of the non-active carbon material is replaced with the active material, such as carbon monofluoride. The addition of the active material extends the duration of the discharge voltage and increases discharge capacity of the lithium oxyhalide cell. In addition, depending upon the amount of incorporated $CF_x$, the active material causes a lithium oxyhalide cell to exhibit a substantially stable secondary discharge voltage plateau. This secondary voltage plateau typically occurs at a discharge voltage at or less than about 3.0 V, which is near the end-of-life of the cell. Therefore, the occurrence of the secondary discharge voltage plateau serves as a useful end-of-life indicator.

In general, the addition of the active material, specifically, $CF_x$ within the cathode structure of the lithium oxyhalide cell increases the surface area of the cathode. This increase in cathode surface area creates additional surface on which the reaction products from the reduction reaction of the catholyte deposit. Thus, the additional cathode surface area created by the addition of the $CF_x$ further extends the duration of the first reduction reaction between the lithium and oxyhalide constituents which extends voltage discharge and increases discharge capacity. Secondly, the $CF_x$ within the cathode structure undergoes a second reduction reaction in which lithium ions react with the cathode material during discharge to provide a secondary discharge voltage and discharge capacity.

During cell discharge the first reduction reaction occurs between lithium and the oxyhalide catholyte. The first reduction reaction, which typically occurs at discharge voltages above 3.0 V, produces a discharge voltage and lithiated chloride that deposits on the cathode surface and within pores of the cathode structure. In addition, a second reduction reaction occurs between lithium and the active cathode material, such as $CF_x$. This second reduction reaction, which generally occurs at discharge voltages of 3.0 V or below, produces a substantially stable discharge voltage plateau and carbon. The following are exemplary first and second reduction reactions that may occur within a lithium oxyhalide cell of the present invention.

Example First Reduction Reactions:
Lithium-Sulfuryl Chloride

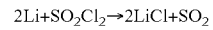
$$2Li + SO_2Cl_2 \rightarrow 2LiCl + SO_2$$

Lithium-Thionyl Chloride

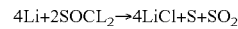
$$4Li + 2SOCl_2 \rightarrow 4LiCl + S + SO_2$$

Example Second Reduction Reaction:
Lithium-Carbon Monofluoride

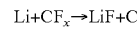
$$Li + CF_x \rightarrow LiF + C$$

In a preferred embodiment, both the first and second reduction reactions contribute to the overall discharge voltage and capacity of the lithium oxyhalide cell. As a result, the addition of the active cathode material generally causes a lithium oxyhalide cell to exhibit a greater amount of discharge capacity than if the cell did not comprise the active cathode material. In addition, since the active carbon material, such as carbon monofluoride, generally occupies about the same volume within the cathode as the non-active material that was replaced, the inclusion of the active carbon material provides the cathode and cell thereof additional energy without occupying additional cell volume. Thus, the energy density of the lithium oxyhalide cell of the present invention is further increased.

As previously mentioned, a preferred active cathode material is carbon monofluoride, $(CF_x)$, which has a relatively high energy density compared to other non-active cathode materials. $CF_x$ is generally known to have a specific capacity of about 875 mAh/g, which contributes to the overall discharge capacity of a lithium oxyhalide cell of the present invention. Furthermore, $CF_x$ replaces some of the non-active material within the cathode structure on a 1:1 volume basis. Therefore, the addition of $CF_x$ increases the energy density of the cell as the active material does not occupy a greater cell volume as compared to the non-active carbon material.

In a preferred embodiment, the first active material is a fluorinated carbon, preferably, carbon monofluoride, having the formula $CF_x$ where x ranges from about 0.5 to about 1.2, more preferably from about 0.9 to about 1.1. Stoichiometric proportions of the first active material and the second non-active material are mixed together, such as by milling the two materials together. Alternatively, stoichiometric proportions of the first active material and the second non-active material may be reacted together by a chemical addition reaction or otherwise intimate contact of the various materials thereof to form a cathode material mixture. In a preferred embodiment, the first active material and the second non-active material may be heated together above ambient temperature for about 1 to 5 hours. For example, the first and second materials may be heated together at a temperature ranging from about 50° C. to about 800° C. for about 1 to 5 hours.

In a preferred embodiment, the first active material, $(CF_x)$, comprises from about 5 to about 95 weight percent of the total cathode material mixture, the remainder comprising the second non-active material. More preferably, the first active material, $(CF_x)$, may comprise from about 25 to about 90 weight percent of the total cathode material mixture, the remainder comprising the second non-active material. Most preferably, the first active material, $(CF_x)$, may comprise from about 40 to about 80 weight percent of the total cathode material mixture, the remainder comprising the second non-active material. The preferred second non-active material is acetylene black.

In addition, a binder material such as a powdered fluoro-polymer, more preferably powdered polytetrafluoroethylene (PTFE) or powdered polyvinylidene flouride may be added to the cathode material mixture. In a preferred embodiment, the binder material may comprise about 1 to about 15 weight percent of the total cathode material mixture. In a preferred embodiment, the cathode material mixture comprises a first active material, a second non-active material, and a binder such as a powdered fluoro-polymer.

Cathode components for incorporation into an electrochemical cell according to the present invention may be prepared by rolling, spreading or pressing the cathode material mixture of the first active cathode material, the second non-active cathode material, and binder onto a suitable current collector selected from the group consisting of nickel, stainless steel, titanium, tantalum, platinum, gold, aluminum, cobalt nickel alloys, nickel-containing alloys, highly alloyed ferritic stainless steel containing molybdenum and chromium, nickel-, chromium-and molybdenum-containing alloys, conductive carbon, and conductive polymers. Cathodes prepared as described above may be in the form of one or more plates operatively associated with at least one or more plates of anode material, or in the form of a strip wound with a corresponding strip of anode material in a structure similar to a "jellyroll".

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode materials and both chemically unreactive with and insoluble in the catholyte. In addition, the separator material has a degree of porosity sufficient to allow flow therethrough of the catholyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The cell further comprises a non-aqueous ionically conductive catholyte operatively associated with the anode and the cathode. The catholyte serves as a medium for migration of ions between the anode and the cathode during the cell's electrochemical reactions. In a preferred embodiment, the catholyte comprises a nonaqueous solvent depolarizer. Suitable nonaqueous solvent depolarizers exhibit those physical properties necessary for ionic transport, namely, low viscosity, low surface tension and wettability. These nonaqueous depolarizers are preferably comprised of an inorganic salt dissolved in a nonaqueous co-depolarizer system and, more preferably, a lithium salt dissolved in a catholyte solution comprising a halogen and/or interhalogen dissolved in a nonaqueous solvent. The halogen and/or interhalogen serves as a soluble depolarizer. They can also serve as a co-solvent in the electrochemical cell. The halogen is selected from the group of iodine, bromine, chlorine or fluorine while the interhalogen is selected from the group of ClF, ClF$_3$, ICl, ICl$_3$, IBr, IF$_3$, IF$_5$, BrCl, BrF, BrF$_3$, BrF$_5$, and mixtures thereof. The mole ratio of any one of the above-referenced halogens and/or interhalogens dissolved in any one of the above-referenced nonaqueous organic or inorganic solvents is from about 1:6 to about 1:1. The nonaqueous solvent depolarizer also may be one or a mixture of more than one of the inorganic solvents which can serve as both a solvent and a depolarizer such as thionyl chloride, sulfuryl chloride, selenium oxychloride, chromyl chloride, phosphoryl chloride, phosphorous sulfur trichloride, and others.

The ionic conductivity of the nonaqueous catholyte solution is preferably facilitated by dissolving a lithium salt in the nonaqueous depolarizer. Exemplary salts are lithium halides such as LiCl and LiBr and those of the LiMX$_n$ type, such as LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$, LiO$_2$CCF$_3$, LiSO$_3$F, LiB(C$_6$H$_4$), LiCF$_3$SO$_3$, and mixtures thereof. Suitable salt concentrations typically range between about 0.25 to about 1.5 molar. The solution of halogen and/or interhalogens, the nonaqueous solvent depolarizer and, optionally, the ionic salt, serve as the co-depolarizer and catholyte of the oxyhalide cell.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises stainless steel such as 52 alloy or 446 stainless steel, although titanium, molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive catholyte solution becomes operatively associated with the anode and the cathode of the cell, an electrical potential difference is developed between terminals operatively connected to the anode and the cathode. During discharge, the electrochemical reaction at the anode includes oxidation to form metal ions. The electrochemical reaction at the cathode involves conversion of these ions which migrate from the anode to the cathode into atomic or molecular forms. In addition, the halogen and/or interhalogen of the catholyte is believed to undergo a reaction or reactions with the lithium ions thereof resulting in the formation of a compound or complex which exhibits the observed open circuit voltage of the cell.

As previously mentioned, the incorporation of the active cathode material, preferably CF$_x$, within the cathode structure increases the surface area of the cathode. As a result, the first reduction reaction that occurs between the lithium ions from the anode and the halogen and/or interhalogen from the catholyte is extended thereby producing additional discharge voltage and capacity.

EXAMPLE I

In order to demonstrate the advantages attributed to the present invention, two hermetically sealed lithium oxyhalide coin cells were constructed and tested. Each cell was constructed having about the same weight of anode and catholyte. The cathodes of the respective first and second test cells were constructed having about the same volume but of a different composition. The cathode of the first cell, test cell 1, was constructed similar to that of a traditional lithium oxyhalide cathode comprising about 90 weight percent non-active acetylene black and about 10 weight percent PTFE binder. The cathode of the second cell, test cell 2, was constructed according to an embodiment of the present invention comprising about 80 weight percent active carbon monofluoride, 10 weight percent non-active acetylene black and about 10 weight percent PTFE binder. The anode of both test cells 1 and 2 was composed of lithium and the catholyte of the cells was composed of thionyl chloride with 1.8 M lithium tetrachloroaluminate salt. Both test cells 1 and 2 were discharged in which the discharge voltage was measured as a function of capacity delivered in mAh.

FIG. 1 illustrates the discharge testing results in which each of the first and second test cells of Example I were fully discharged. Curve 10 represents the discharge profile of test cell 1 which comprised the cathode composed of about 90 weight percent acetylene black and about 10 weight percent PTFE. Curve 12 represents the discharge profile of test cell 2 which comprised a cathode composed of about 80 weight percent CF$_x$, 10 weight percent acetylene black and about 10 weight percent PTFE.

As illustrated by the graph of FIG. 1, both test cells had an initial discharge voltage of about 3.6 V. Test cell 1 exhibited a discharge capacity of about 320 mAh after which the cell's discharge voltage abruptly dropped as the cell reached end-of-life. In comparison, test cell 2, which comprised a cathode composed of a mixture of about 80 weight percent CF$_x$, exhibited an increased discharge capacity 14 of about 520 mAh, which was about 200 mAh more than the discharge capacity of test cell 1. In addition to the increased discharge capacity at about 3.6 V discharge volts, the second test cell also exhibited a second substantially stable discharge voltage plateau 16 at about 2.3 V. This discharge voltage plateau 16 thus generated an additional discharge capacity of about 20 mAh. Furthermore, the second substantially stable discharge voltage at about 2.3 V may serve as an indicator that the cell is approaching end-of-life.

EXAMPLE II

In addition, two hermetically sealed lithium oxyhalide AA size cells were constructed and tested. A third cell, test cell 3, was constructed similar to that of a prior art lithium oxyhalide cell comprising a cathode composed of about 90 weight percent acetylene black and about 10 weight percent PTFE binder. A fourth cell, test cell 4, was constructed according to an embodiment of the present invention comprising a cathode composed of about 45 weight percent $CF_x$, about 45 weight percent acetylene black and about 10 weight percent PTFE binder. The anodes of the respective test cells were composed of lithium and were constructed having about the same weight and size. The catholyte of both cells was composed of thionyl chloride with 1.8 M lithium tetrachloroaluminate salt. Both test cells 3 and 4 were discharged in which the discharge voltage was measured as a function of discharge capacity in mAh.

Figure 2:
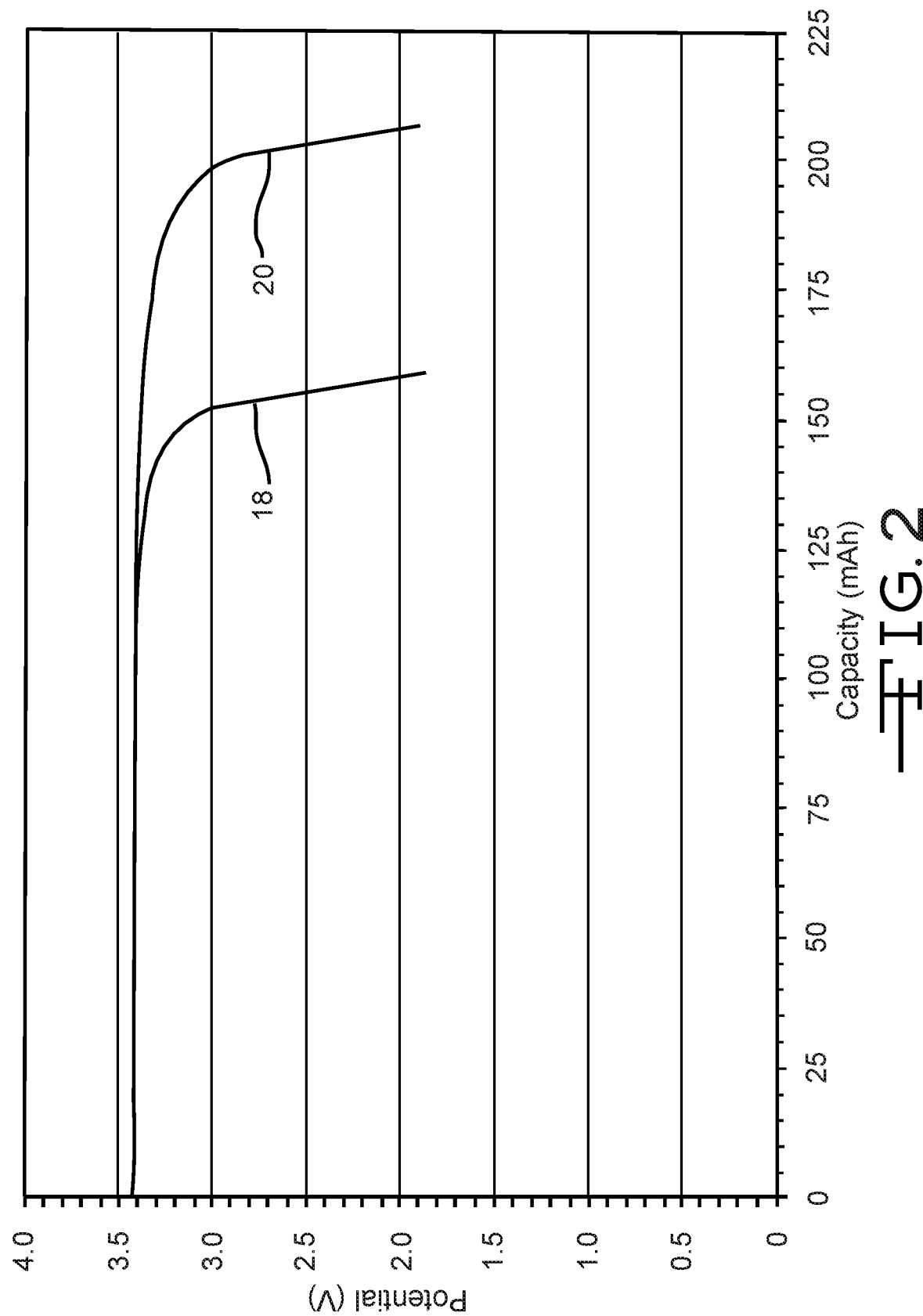
FIG. 2 illustrates the results of discharge testing of two additional lithium oxyhalide electrochemical cells. One cell was constructed according to an embodiment of the present invention comprising a cathode composed of a mixture of acetylene black and carbon monofluoride. The second cell was constructed comprising a cathode composed of acetylene black.

FIG. 2 illustrates the discharge testing results in which the third and fourth AA sized test cells from Example II were fully discharged. Curve 18 represents the discharge profile of test cell 3 which comprised a cathode composed of about 90 weight percent acetylene black and about 10 weight percent PTFE. Curve 20 represents the discharge profile of test cell 4 which comprised a cathode composed of about 45 weight percent $CF_x$, 45 weight percent acetylene black and about 10 weight percent PTFE.

As illustrated by the graph of FIG. 2, test cell 3, which was constructed having a cathode comprised of non-active carbon material, exhibited an overall discharge capacity of about 160 mAh. In comparison, test cell 4, which was constructed having a cathode comprised of about 45 weight percent active $CF_x$, exhibited a discharge capacity of about 210 mAh. The lithium test cell comprising the $CF_x$ active material, thus exhibited an increase in discharge capacity of about 31 percent in comparison to test cell 3 that did not comprise $CF_x$.

DISCUSSION OF RESULTS

The discharge test results illustrated in FIGS. 1 and 2 clearly indicate that the addition of $CF_x$ within the cathode of a lithium oxyhalide electrochemical cell significantly increases discharge capacity. Test cell 2 of Example I which comprised about 80 weight percent $CF_x$, exhibited a significant increase in discharge capacity of about 200 mAh or about 52.5% more than respective test cell 1 that did not comprise $CF_x$. In addition, test cell 4 of Example II, which comprised about 45 weight percent $CF_x$, also exhibited a significant increase in discharge capacity in comparison to test cell 3 which did not comprise $CF_x$. As illustrated from FIG. 2, test cell 4 exhibited about 65 mAh or about 40% more capacity than the respective test cell 3 that did not comprise $CF_x$.

The discharge test results appear to indicate that an increasing amount of $CF_x$ within a cathode structure of a lithium oxyhalide cell increases its overall capacity, as evidenced by the discharge results of test cells 2 and 4. As illustrated, test cell 2 that comprised the greater weight percent of CFx, exhibited the greater discharge capacity in comparison to test cell 4. Thus, in general, the discharge test results appear to indicate that a greater weight percent of $CF_x$ within the cathode structure causes an increase in cell discharge capacity. This correlation is generally believed to be the result of increased cathode surface area stemming from the incorporation of a greater amount of $CF_x$ within the carbon structure. However, while the test results indicate that, in general, there is a direct correlation between increased weight percent of $CF_x$ within the cathode and increased discharge capacity, it is not desirable to construct a lithium oxyhalide cathode entirely of $CF_x$. This is because $CF_x$ is generally a poor conductor of electricity and a lithium oxyhalide cathode must comprise a material that exhibits a degree of electrical conductivity of which $CF_x$ is not sufficient.

It is noted that U.S. Pat. No. 6,780,542 to Spillman et al., assigned to the assignee of the present invention and incorporated herein by reference, discloses a lithium oxyhalide cell which comprises a lithium carbonate passivation layer on the lithium anode to minimize voltage delay. In addition, Spillman discloses that the cathode current collector of the oxyhalide cell may be composed of an electrically conductive material, including carbon monofluoride, $CF_x$. However, constructing a lithium oxyhalide cell comprising a cathode composed entirely of $CF_x$ is not advisable as the electrical conductivity of the $CF_x$ material, which is about $10^{-14}$ S/cm (Touhara et al. (1987) 2. *Anorg. All. Chem.* 544:7), is not adequate for a lithium oxyhalide cell to operate.

In contrast, the lithium oxyhalide cell of the present invention is a hybrid cell that comprises a cathode composed of an active material portion, CFx, and an inactive material portion, i.e., acetylene black that is electrically conductive. Thus, unlike a cathode of a traditional lithium oxyhalide cell, the cathode of the present invention does not act solely as a current collector, but rather, in addition, comprises a portion of a cathode material that chemically reacts within the lithium oxyhalide cell to provide an additional discharge voltage. The addition of the active material, $CF_x$, in specific proportions, thus, enables a desired modification of the extended discharge voltage and capacity exhibited by a lithium oxyhalide cell. A specific amount of the active $CF_x$ material chemically reacts with lithium ions in the catholyte solution to provide additional discharge voltage and increased discharge capacity. The addition of the non-active carbonaceous material provides electrical conductivity within the cell that enables cell operation. Thus, as illustrated by the test results, the discharge and capacity characteristics of a lithium oxyhalide cell can by modified by specific amounts of $CF_x$ incorporated within the cathode of the cell. These preferred amounts of CFx and inactive material, respectively, are not disclosed by Spillman and thus, would not be obvious to one of ordinary skill in the art.

With regards to the lithium oxyhalide cell of the present invention, the increased amount of carbon surface area provided by the $CF_x$ allows for more of the first reduction reaction product to deposit on the surface of the cathode. Thus, the increased carbon surface area provides additional sites on which the reaction products of the first reduction reaction deposit, thereby extending the discharge voltage, and increasing discharge capacity as indicated by test cells 2 and 4 of Examples I and II (12, 20 FIGS. 1 and 2).

In addition, as shown in FIG. 1, test cell 2 that comprised the greater amount of $CF_x$, also exhibited the second discharge voltage plateau 16 at about 2.3 V. This second discharge voltage plateau 16 is generally believed to be the result of discharge voltage produced from the second reduction reaction of the $CF_x$ after the lithium-oxyhalide first reduction reaction of the oxyhalide was complete.

The first reduction reaction between lithium and the catholyte is generally of a greater energy state than the second reduction reaction between lithium and active $CF_x$ material. Thus, as the lithium oxyhalide cell of the present invention discharges, a first discharge plateau at a higher discharge voltage, generally greater than about 3.0 V (~3.6 V in FIG. 1 and ~3.4 V in FIG. 2) is generated. After the first reduction reaction of the catholyte material nears completion, the second reduction reaction between lithium and $CF_x$ takes over, typically exhibiting a lower voltage plateau at or below 3.0 V (~2.3 V in FIG. 1). The second discharge voltage plateau 16 thus serves as an indicator that the cell is approaching end-of-life.

The test results appear to indicate that there is a threshold amount of active cathode material, such as $CF_x$, incorporated within the cathode structure to exhibit this second discharge voltage plateau 16. For example, test cell 4, which comprised a lesser amount of $CF_x$, did not exhibit a second discharge voltage plateau as was exhibited in test cell 2. Thus, from the test results as illustrated in FIGS. 1 and 2, it is preferred that a lithium oxyhalide cathode comprises at least about 40 weight percent active cathode material, i.e., $CF_x$, of the total cathode material formulation to exhibit a substantially stable end-of-life indicator as exhibited in the test results shown in FIG. 1. However, this threshold amount of $CF_x$ added to the total cathode material formulation may be as low as 10 weight percent depending upon certain parameters such as cell size, the volume of catholyte and/or the volume of the anode within the cell. Therefore, depending on the proportion of $CF_x$ added to the cathode material mixture, it is possible to observe two voltage plateaus during cell discharge as illustrated by the discharge test results of FIG. 1.

Thus, lithium oxyhalide electrochemical cells constructed with a cathode comprising the mixture of an electrochemically active and non-active material of the present invention have increased discharge capacity. In addition, a cathode comprising the mixture of an electrochemically active and non-active material of the present invention also enables a lithium oxyhalide electrochemical cell to exhibit a substantially stable discharge voltage plateau that may serve as a discernible end-of-life indicator. The above detailed description and examples are intended for purposes of illustrating the invention and are not to be construed as limited.

What is claimed is:

1. A primary electrochemical cell, comprising:
   a) a casing housing:
      i) an anode of lithium or a lithium alloy;
      ii) a cathode mixture consisting of:
         A) a first electrochemically non-active carbonaceous material;
         B) a second electrochemically active fluorinated carbon; and
         C) a binder;
         D) wherein the first electrochemically non-active carbonaceous material comprises from about 5% to about 20%, by weight, of the cathode mixture, the second electrochemically active fluorinated carbon comprises from about 80% to about 95%, by weight, of the cathode mixture, and the binder constitutes the remaining weight percentage of the cathode mixture; and
      iii) a separator residing between the anode and the cathode mixture; and
      iv) a catholyte contacting the anode and the cathode mixture, wherein the catholyte comprises an inorganic depolarizer selected from the group consisting of thionyl chloride, sulfuryl chloride, and phosphoryl chloride, and mixtures thereof,
   b) wherein, upon discharge, the electrochemical cell is configured to undergo a first reduction reaction between the catholyte and lithium ions supplied by the anode to thereby exhibit a first discharge voltage plateau in a range of about 3.4 V to about 3.6 V, and
   c) wherein the electrochemical cell is configured to undergo a second reduction reaction between lithium ions supplied by the anode and the second electrochemically active fluorinated carbon to thereby exhibit a second discharge voltage plateau at about 2.3 V.

2. The primary electrochemical cell of claim 1, wherein the first electrochemically non-active carbonaceous material is selected from the group consisting of acetylene black, graphitic carbon, non-graphitic carbon, coke, charcoal, and combinations thereof.

3. The primary electrochemical cell of claim 1, wherein the second electrochemically active fluorinated carbon comprises a chemical formula of $CF_x$, wherein x ranges from about 0.5 to about 1.2.

4. The primary electrochemical cell of claim 1, wherein the second electrochemically active fluorinated carbon comprises a chemical formula of $CF_x$, wherein x ranges from about 0.9 to about 1.1.

5. The primary electrochemical cell of claim 1, wherein the catholyte comprises a co-depolarizer system of an interhalogen dissolved in the inorganic depolarizer, the interhalogen being selected from the group of $ClF$, $ClF_3$, $ICl$, $ICl_3$, $IBr$, $IF_3$, $IF_5$, $BrCl$, $BrF$, $BrF_3$, $BrF_5$, and mixtures thereof.

6. The primary electrochemical cell of claim 1, wherein the catholyte comprises a co-depolarizer system of a halogen dissolved in the inorganic depolarizer, the halogen being selected from the group consisting of iodine, bromine, chlorine, fluorine, and mixtures thereof.

7. The primary electrochemical cell of claim 1, wherein the lithium alloy of the anode is selected from the group consisting of Li—Mg, Li—Si, Li—Al, Li—B, Li—Si—B, Li—Al—Mg, and mixtures thereof.

8. The primary electrochemical cell of claim 1, wherein a lithium salt selected from the group consisting of LiCl, LiBr, $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2$, $LiO_2CCF_3$, $LiSO_3F$, $LiB(C_6H_5)_4$, $LiCF_3SO_3$, and mixtures thereof is dissolved in the catholyte.

9. The primary electrochemical cell of claim 8, wherein the lithium salt is dissolved in the catholyte at a concentration that ranges from about 0.25 to about 1.5 molar.

10. A primary electrochemical cell, comprising:
    a) a casing housing:
       i) an anode of lithium or a lithium alloy;
       ii) a cathode mixture consisting of:
          A) acetylene black as a first electrochemically non-active carbonaceous material;
          B) $CF_x$ as a second electrochemically active fluorinated carbon, wherein in the $CF_x$, x ranges from about 0.5 to about 1.2; and
          C) a binder,
          D) wherein the acetylene black comprises from about 5% to about 20%, by weight, of the cathode mixture, the $CF_x$ comprises from about 80% to about 95%, by weight, of the cathode mixture, and the binder constitutes the remaining weight percentage of the cathode mixture; and iii) a separator residing between the anode and the cathode mixture; and iv) thionyl chloride as a catholyte contacting the anode and the cathode mixture, b) wherein, upon discharge, the electrochemical cell is configured to undergo a first reduction reaction between the thionyl chloride and lithium ions supplied by the anode to thereby exhibit a first discharge voltage plateau in a range of about 3.4 V to about 3.6 V, and c) wherein, upon cessation of the first reduction reaction, the electrochemical cell is configured to undergo a second reduction reaction between lithium ions supplied by the anode and the $CF_x$ to thereby exhibit a second discharge voltage plateau at about 2.3 V.

11. The primary electrochemical cell of claim 10, wherein in the $CF_x$, x ranges from about 0.5 to about 1.2.

12. The primary electrochemical cell of claim 10, wherein 1.8 M LiAlCl$_4$ is dissolved in the thionyl chloride.

13. The primary electrochemical cell of claim 10, wherein an interhalogen is dissolved in the thionyl chloride, the interhalogen being selected from the group of ClF, ClF$_3$, IC$_1$, IC$_{13}$, IBr, IF$_3$, IF$_5$, BrCl, BrF, BrF$_3$, BrF$_5$, and mixtures thereof.

14. The primary electrochemical cell of claim 10, wherein a halogen is dissolved in the thionyl chloride, the halogen being selected from the group consisting of iodine, bromine, chlorine, fluorine, and mixtures thereof.

15. A primary electrochemical cell, comprising:
a) a casing housing:
 i) an anode of lithium or a lithium alloy;
 ii) a cathode mixture consisting of, by weight:
  A) about 10% acetylene black;
  B) about 80% $CF_x$, wherein x ranges from about 0.5 to about 1.2; and
  C) about 10% PTFE binder; and
 iii) a separator residing between the anode and the cathode mixture; and
 iv) thionyl chloride as a catholyte contacting the anode and the cathode mixture, b) wherein, upon discharge, the electrochemical cell is configured to undergo a first reduction reaction between the thionyl chloride and lithium ions supplied by the anode to thereby exhibit a first discharge voltage plateau in a range of about 3.4 V to about 3.6 V, and c) wherein, upon cessation of the first reduction reaction, the electrochemical cell is configured to undergo a second reduction reaction between lithium ions supplied by the anode and the $CF_x$ to thereby exhibit a second discharge voltage plateau at about 2.3 V.

16. The primary electrochemical cell of claim 15, wherein in the $CF_x$, x ranges from about 0.5 to about 1.2.

17. The primary electrochemical cell of claim 15, wherein 1.8 M LiAlCl$_4$ is dissolved in the thionyl chloride.

18. The primary electrochemical cell of claim 15, wherein an interhalogen is dissolved in the thionyl chloride, the interhalogen being selected from the group of ClF, ClF$_3$, ICl, ICl$_3$, IBr, IF$_3$, IF$_5$, BrCl, BrF, BrF$_3$, BrF$_5$, and mixtures thereof.

19. The primary electrochemical cell of claim 15, wherein a halogen is dissolved in the thionyl chloride, the halogen being selected from the group consisting of iodine, bromine, chlorine, fluorine, and mixtures thereof.

* * * * *

UNITED STATES PATENT AND TRADEMARK OFFICE
CERTIFICATE OF CORRECTION

PATENT NO. : 10,727,486 B2
APPLICATION NO. : 14/968600
DATED : July 28, 2020
INVENTOR(S) : Arden P. Johnson and Yufei Wang It is certified that error appears in the above-identified patent and that said Letters Patent is hereby corrected as shown below:

In the Claims

Column 16, Line 26 (Claim 18) delete "CIF" and insert --ClF--

Signed and Sealed this
Ninth Day of May, 2023

Katherine Kelly Vidal
*Director of the United States Patent and Trademark Office*